United States Patent [19]
Kerns et al.

[11] 3,833,226
[45] Sept. 3, 1974

[54] SEAL APPARATUS FOR OIL DRIVEN GEAR MOTOR

[75] Inventors: Gary Paul Kerns, Fenwick; Raymond L. McElroy, Craigsville, both of W. Va.

[73] Assignee: Standard Hydraulics Service of Charleston, Inc., Craigsville, W. Va.

[22] Filed: Feb. 5, 1973

[21] Appl. No.: 329,637

[52] U.S. Cl. .......................... 277/3, 277/59, 277/65, 277/DIG. 8
[51] Int. Cl. ......................... F16j 15/38, F16j 15/40
[58] Field of Search .............. 277/3, 15, 16, 59, 65, 277/DIG. 8

[56] References Cited
UNITED STATES PATENTS

| | | | |
|---|---|---|---|
| 2,759,583 | 8/1956 | Ward | 277/DIG. 8 |
| 2,895,751 | 7/1959 | Standish | 277/3 |
| 3,021,146 | 2/1962 | Sommer et al. | 277/59 |
| 3,035,841 | 5/1962 | Riester | 277/3 |
| 3,085,808 | 4/1963 | Williams | 277/3 |
| 3,168,871 | 2/1965 | Sieghartner | 277/65 |
| 3,213,798 | 10/1965 | Carswell | 277/59 |
| 3,375,014 | 3/1968 | Chubb et al. | 277/59 |

*Primary Examiner*—William D. Martin, Jr.
*Assistant Examiner*—Robert L. Smith
*Attorney, Agent, or Firm*—Webb, Burden, Robinson & Webb

[57] ABSTRACT

In an oil driven gear motor of the type having a high oil pressure portion and a low pressure portion and a drive shaft rotatably mounted therein, a seal apparatus is provided. The seal apparatus is formed in a motor housing having oil passageways formed therein extending from the high and low oil pressure portions of the motor to an intermediate seal member. The intermediate seal member is positioned around the rotatable motor shaft, located intermediate two seal rings. The intermediate seal member contains oil ducts which communicate with the aforementioned oil passageway of the motor. A seal seating member is provided to enclose the seal assembly so as to permit the confinement of oil at high pressure within the area of the two seal rings and intermediate seal adjacent the motor shaft. This pressurized seal partially counteracts the high oil pressure present on the motor side of the seal thus yielding a more oil impervious seal. Also provided is an auxiliary motor housing having an orifice therethrough to allow the introduction of water therein. The water flows into an axial bore extending within the motor shaft. Water seal means are associated with the seal seating member to prevent water leakage around the shaft in the area of the oil seal rings. Water and oil leak detection means are also provided in the area of the seal seating member to allow visual determination of seal integrity.

10 Claims, 4 Drawing Figures

SEAL APPARATUS FOR OIL DRIVEN GEAR MOTOR

SUMMARY OF INVENTION

Our invention relates generally to motor shaft seals and more specifically to shaft seals used in oil driven gear motors. Our invention is particularly suited for use in oil driven gear motors of the type used in drilling bore holes in mining applications. Due to the fine dust particles which are generated by the mining drill bit, it is often necessary to introduce water in the area of the bore hole in order to inhibit the air born movement of such dust particles. Heretofore, water has been introduced into the bore hole by way of a source separate and apart from the drilling machine. This has proved too cumbersome and unsatisfactory. Likewise, prior devices have introduced water to the bore hole by locating water inlets intermediate the drill motor and drill chuck. This has, likewise, proved to be unsatisfactory due to its inherent vulnerability to breakage, the cumbersome nature of the device, and the handling problems.

Our invention solves the problems heretofore encountered by providing a seal apparatus in an oil driven gear motor which permits the introduction of water directly into the interior of a rear auxiliary motor housing and, into an internal bore formed axially within the drill motor shaft. The water then flows within the drill motor shaft directly to the bore hole area.

Our invention, likewise, provides a seal apparatus which can withstand the high oil pressure present in the oil motor due to a pressurized seal area located adjacent the motor housing.

Our invention further provides an improved seal assembly which prevents the leakage of water into the oil seal and motor housing areas.

Still further, our invention provides a seal assembly having an externally mounted vent orifice, mounted on the auxiliary housing, whereby any oil or water leakage occurring in the area of the seal assembly may be visually detected.

Specifically, our invention provides a seal apparatus for an oil driven gear motor, the motor having a high oil pressure portion and a low oil pressure portion. Mounted within the motor is a rotatable drive shaft having an axial bore formed therethrough. The seal assembly comprises a motor housing having a shaft receiving bore and at least two oil passageways formed therein. At least one of said passageways is in communication with the high oil pressure portion of the motor, while other of said other passageways are in communication with the low oil pressure portion of the motor. Said passageways extend through the wall of the motor housing and exit at the rear face portion adjacent the shaft receiving bore. Also provided are two seal rings positioned in spaced relationship on the shaft adjacent the shaft receiving bore of the motor housing. An intermediate seal member is also provided and is positioned on the rotatable shaft intermediate the aforementioned two seal rings. The intermediate seal member is annular in shape and has at least two oil ducts formed radially therethrough, the oil ducts extending from the outer periphery of the intermediate seal member to the central bore thereof, adjacent the shaft. The outer periphery of said oil ducts are placed in communication with the aforementioned oil passageways of the motor housing. A seal seating member is provided which has a shaft receiving bore formed therein. The seating member is sealably positioned against the rear face portion of the motor housing. The seating member has a first annular shoulder portion formed adjacent its bore to sealably receive the second seal ring. A second annular shoulder is, likewise, formed in the seating member adjacent the first shoulder to sealably receive the intermediate seal member. The outer periphery of the second shoulder is placed in communication with the ends of the oil passageways of the motor housing to allow the flow of oil from the high pressure portion of the motor to the oil ducts of the intermediate seal member. The oil is then confined under pressure within the space defined by the two seal rings and the seating member. The oil then flows back into the low pressure portion of the motor by way of at least one of said passageways. An auxiliary motor housing is also provided having an interior portion formed to enclose the rear of the shaft and the seal seating member, the auxiliary housing having an open end with an annular shoulder portion formed therein adapted to receive the seal seating member. The auxiliary motor housing is secured to the rear face portion of the motor housing whereby the seal seating member is sealably secured against the rear face portion of the motor housing bearing upon one of the parallel faces of the seating member and against the annular shoulder of the auxiliary housing, thereby bearing upon the opposite parallel face of the seating member. The auxiliary housing also has an orifice formed through its wall to permit the introduction of water therein, thus permitting the water to flow into and through the internal bore of the motor shaft to the drill area. Water seal means are also associated with the seal seating member to prevent water leakage around the motor shaft in the area of the oil seal rings. Vent means associated with the seal seating member and auxiliary housing permit visual observation of any oil or water leakage in the seal apparatus.

In the accompanying drawings we have shown a presently preferred embodiment of our invention in which.

Figure 1:
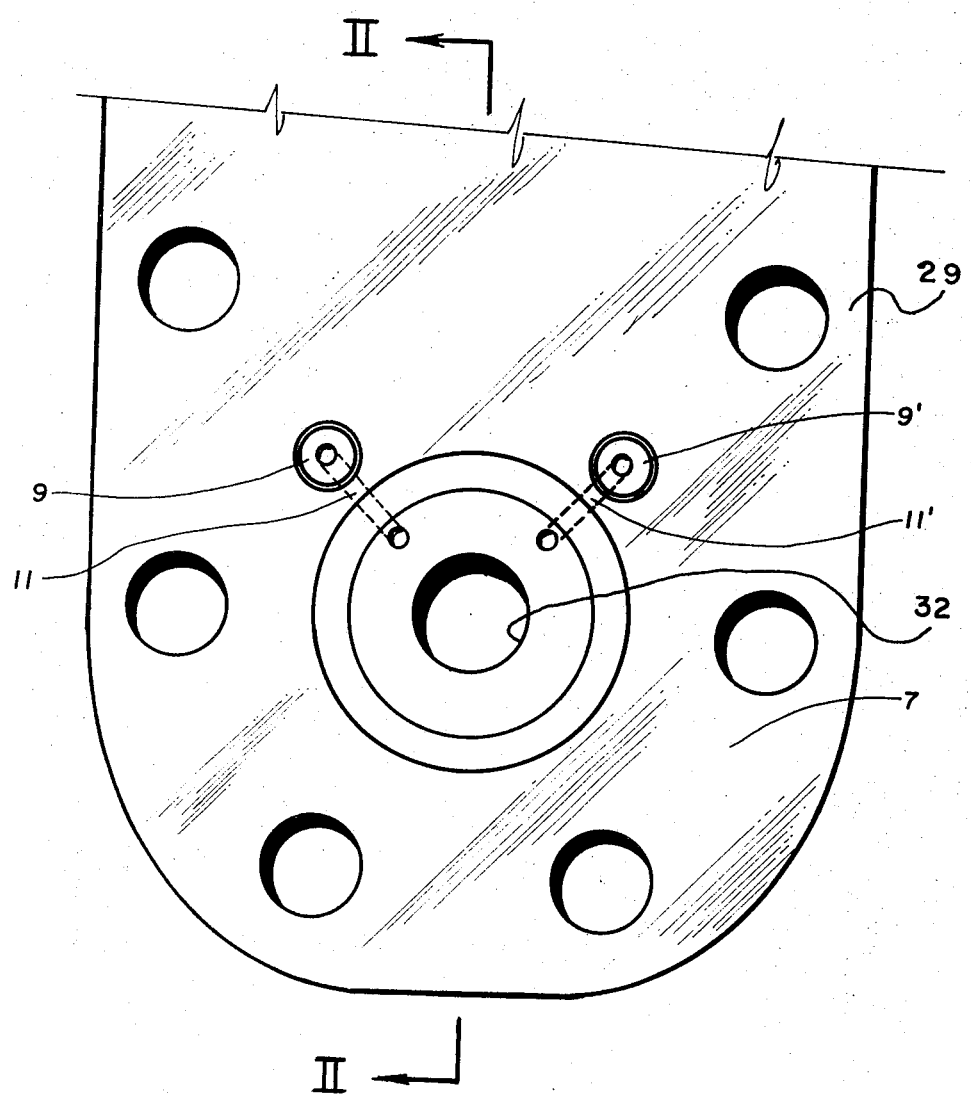
FIG. 1 is a front elevation of a portion of an oil driven gear motor.

The motor housing 7 includes a bore 32 extending rearward of the opening 8 which accommodates the gears (not shown), FIG. 1. Bore 32 receives the rotatable drive shaft 5 therewithin. Motor housing 7 has a generally flat front face 29, upon which are mounted the drive gears. Motor housing 7 also has a flat rear face 30, opposed and parallel to front face 29, FIG. 2. The conventional, oil driven gear motor contains a high oil pressure side and a low oil pressure side in the area of the drive gears, adjacent front face 29 of housing 7.

Figure 2:
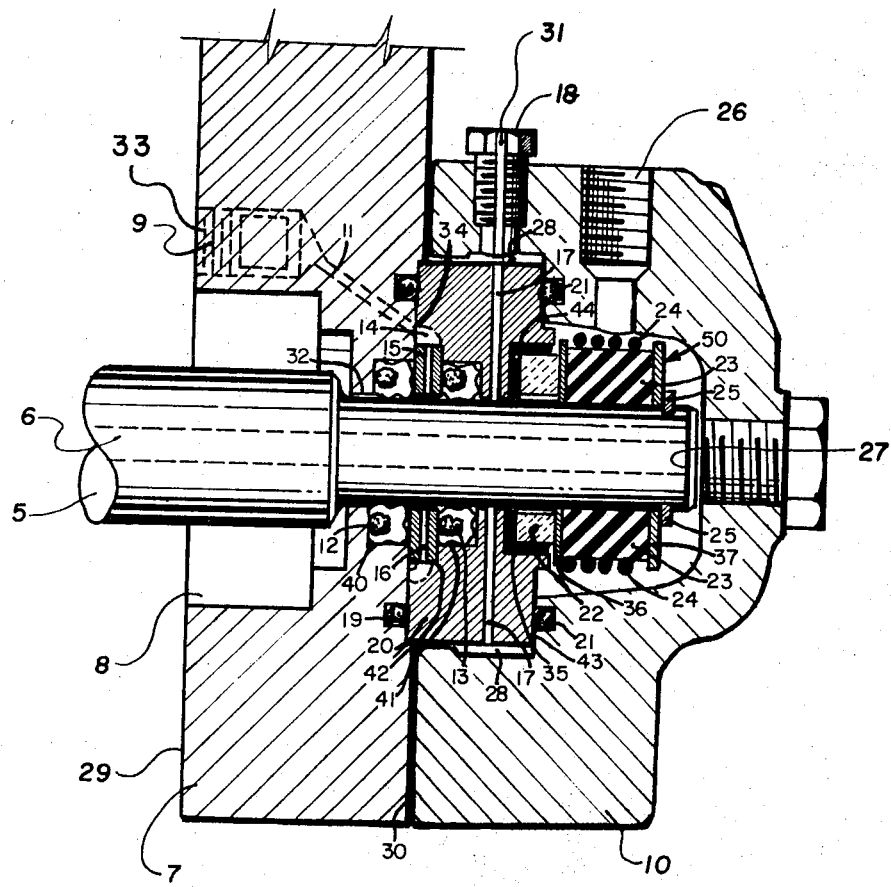
FIG. 2 is a sectional side elevation taken along line II—II of FIG. 1, showing a presently preferred embodiment of the seal apparatus of our invention.
Figures 3, 4:
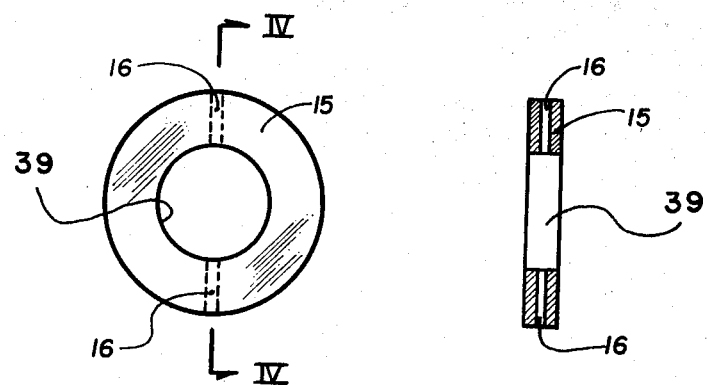
FIG. 3 is a plan view of the intermediate seal member.
FIG. 4 is a sectional side elevation taken along line IV—IV of FIG. 3.

Motor housing 7 has two oil passageways 11, 11' formed therein, FIGS. 1 and 2. Each passageway 11, 11' has a first end positioned at front face portion 29 of housing 7 and a second end terminating at rear face 30 of housing 7. A plurality of passageways may be employed, but we have found that two are sufficient for the purposes of this invention. Oil passageway 11 has its first end positioned in communication with the oil of the high pressure side of the motor, whereas oil passageway 11' has its first end in communication with the oil of the low pressure portion of the motor. The oil passageways 11, 11' extend through the rear face 30 of housing 7, exiting adjacent shaft receiving bore 32, FIG. 2. Orifice plug holes 9, 9' are drilled and tapped at the first ends of passageways 11, 11' although simple holes may be used. Orifice plugs of various preselected internal bore diameters may then be inserted into holes 9, 9' in order to control the flow rate of oil through passageways 11, 11'. These orifice plugs eliminate the costly drilling of small diameter holes for passageways 11, 11'. Thus, the problems of drill breakage and excess labor can be minimized.

As seen in FIG. 2, motor housing 7 also has an annular shoulder 40 formed on its rear face 30 adjacent shaft receiving bore 32. Seal ring 12 is mounted within shoulder portion 40 in sealable engagement around shaft 5. A second seal ring 13 is also sealably positioned around shaft 5 in spaced relationship from first seal ring 12.

An annular intermediate seal member 15 having a central bore 39, is positioned around shaft 5 between seal rings 12 and 13. Bore 39 is formed slightly larger than the diameter of shaft 5 so as to allow free rotation of shaft 5. We have found that a 0.010 inch clearance is sufficient since excess clearance will permit seal ring 12 to extrude under seal member 15 if the clearance is too great. Intermediate member 15 also has two oil ducts 16 formed radially therethrough. Oil ducts 16 extend from the outer peripheral edge of member 15 to the edge of central bore 39, exiting adjacent the rotatable shaft 5. Member 15 is sealably positioned against the rear face 30 of motor housing 7; the outer periphery of member 15 positioned adjacent the second ends of oil passageways 11, 11'. The outer peripheral edge of oil ducts 16 are in communication with the second ends of oil passageways 11, 11'. Member 15 is sealably held in place by cylindrically shaped, seal seating member 20. Seal seating member 20 has two flat, parallel faces disposed on opposite ends thereof, and a shaft receiving bore portion formed therethrough. Seating member 20 is positioned against rear face 30 of motor housing 7, and concentrically positioned adjacent shaft receiving bore 32. Seal seating member 20 also has a first annular shoulder 41 formed adjacent the shaft bore to sealably receive the aforementioned second seal ring 13 therein. Seating member 20 has a second annular shoulder 42 formed in spaced relationship from shoulder portion 41. Shoulder 42 is concentric with shoulder 41, having a larger diameter than shoulder 41. The outer periphery of annular shoulder 42 contains an annular channel 14 in communication with the second ends of oil passageways 11, 11'. Second annular shoulder 42 sealably receives intermediate seal member 15 therein. The outer periphery of oil ducts 16 of member 15 are in communication with annular channel 14 and, hence, in communication with the second ends of oil passageways 11, 11'.

When the oil driven gear motor is in operation, oil flows from the high oil pressure side of the motor, through the oil passageway 11' into and through annular channel 14 and to the low pressure side of the motor through passageway 11. Oil also flows into duct 16 and around shaft bore 39; the oil being confined, under pressure, within the space defined by the first and second seal rings 12 and 13. The pressurized oil also flows through oil ducts 16 into annular channel 14 and, to the low oil pressure portion of the motor via oil passageway 11. There is a continuous flow of oil from the high oil pressure side of the motor to the oil seal area, between the first and second seal rings 12, 13 and then back to the low oil pressure side of said motor. In this fashion, we achieve a pressurized oil seal area which partially offsets the high pressure present in the oil driven motor. It can be appreciated that such a pressurized oil seal yields a much stronger and more oil impervious seal.

The oil pressure within the seal area is maintained at about one half the difference between the high oil pressure and the low oil pressure within the motor by keeping the diameters of the passageways 11, 11' equal, or in the event orifice plugs are used at 9, 9' keeping the orifice diameters equal. By way of specific example, a typical oil driven gear motor may have an inlet oil pressure or high pressure portion of 1,500 p.s.i. and a discharge or low pressure portion of 50 p.s.i. Under these conditions, with the diameter of passageways 11, 11' or orifice plugs at 9, 9' being equal, the oil pressure within the oil seal area, between the first and second seal rings 12, 13, would be 725 p.s.i. Hence, our pressurized seal reduces the effective oil pressure acting on the seal to one half its real value. In this manner, we are able to increase seal life and, likewise, achieve an improved oil seal so as to permit the introduction of water into the rear of the apparatus, as will be discussed in greater detail hereinafter.

Means associated with motor housing 7 are also provided to forceably secure seal seating member 20 to the rear face 30 of housing 7 whereby oil leakage around member 20 and shaft 5 is prevented. This means comprises an auxiliary housing member 10, having an open interior portion, to enclose seal seating member 20 and the rear portion of shaft 5. Auxiliary housing 10 has an open end with an annular shoulder 43 formed therein to receive seal seating member 20 therein. Auxiliary housing 10 is secured to the rear face 30 of motor housing 7 by conventional bolts or the like. In the secured positions, auxiliary housing 10 maintains a sealed relationship between seal seating member 20 and motor housing 7. Hence, seal seating member 20 is sealably secured against the rear face 30 of housing 7 on one of the parallel faces of member 20 and against annular shoulder 43 of auxiliary housing 10 on the opposite parallel face of seating member 20.

An O-ring 19 is also preferably included and is sealably positioned at the interface of the rear face portion 30 of motor housing 7 and seal seating member 20. O-ring 19 is radially positioned between the second ends of oil passageways 11, 11' and outer periphery of seal seating member 20 to prevent oil leakage around seating member 20.

Auxiliary housing 10 includes an orifice 26 formed through its wall to permit the introduction of pressurized water into auxiliary housing 10. Motor shaft 5 includes an internal bore 6, formed along its longitudinal axis and extending to the drill area (not shown). Water introduced within auxiliary housing 10, via orifice 26, flows into bore 6 of shaft 5 and bore hole area so as to achieve the desired wet drilling results. A mechanical seal, generally designated 50, is also provided in association with seal seating member 20 to prevent water leakage around shaft 5 toward the area of second seal ring 13.

Seal seating member 20 has a third annular shoulder 44 formed adjacent its shaft receiving bore, located on the face of member 20 opposite that of the first and second shoulders 41, 42. A cup-shaped seal member 35 having a shaft receiving bore therethrough is sealably positioned within the third annular shoulder portion 44 of seating member 20. A first face seal member 22, annular in shape and having a shaft receiving bore therethrough is sealably positioned within cup-shaped seal member 35. First face seal member 22 has a substantially flat face which is substantially perpendicular to the longitudinal axis of its bore portion. A second face seal member 23 having an annular shape with a shaft receiving bore therethrough and an annular face perpendicular to the longitudinal axis of its bore portion sealably engages the face portion of first face seal member 22 when the second seal member 23 is rotated relative thereto. The bore portion of second face seal 23 also sealably engages shaft 5 when mounted thereon. Second face seal member 23 is adapted to rotate with shaft 5 and, while rotating, sealably engage first face seal member 22. Because of this relative rotative movement between face seals 22 and 23, it is preferable that the seals be constructed of wear resistant materials so as to increase their useful life. First face seal 22 may be a dense ceramic material while second face seal 23 may be a rubber compound having a carbon face. Securement means are also associated with second face seal member 23 to forceably urge seal 23 into water tight engagement against first face seal member 22 along with maintaining the seal between the bore of second member 23 and shaft 5 as shaft 5 rotates.

The securement means includes a second face seal member 23 having a ledge portion 36 integrally associated therewith. Ledge 36 may be an extention of member 23 or it may be a metal closure attached thereto as by mechanical crimping or staking. Ledge portion 36 extends outwardly from member 23 around the outer periphery thereof. A coil spring 24 is positioned around second face seal member 23, spring 24 having a first end portion and a second end portion located at its extremities, the first end portion of spring 24 positioned against ledge portion 36. A retaining cup 37, having a shaft receiving bore therethrough receives the second end portion of spring 24 therein. Securement means for retaining cup 37 are also provided, preferably in the form of a conventional snap ring 25 detachably secured to shaft 5. Snap ring 25 is located adjacent retaining cup 37 so as to maintain spring 24 in a compressed state whereby the water tight seal between the first and second face seal members 22, 23, and the seal between the bore of second face seal 23 and shaft 5 are maintained while shaft 5 is rotated.

An O-ring 21 is also preferably included, sealably positioned at the interface of auxiliary housing 10 and seal seating member 20 to prevent water leakage around housing 10 and member 20.

The seal apparatus also includes leak detection means in the area between the pressurized oil seal and the water seal means 50. Seal seating member 20 has a plurality of vent holes 17 formed radially therethrough and extending from the shaft receiving bore of member 20 to the outer cylindrical periphery thereof. Vent holes 17 are positioned intermediate first annular shoulder 41 and third annular shoulder 44 of seating member 20, thus, positioned intermediate the pressurized oil seal and the water seal means 50. Auxiliary motor housing 10 also has a vent channel 28 formed around the wall of its annular shoulder 43. Vent channel 28 forms a relief around the outer periphery of seating member 20 in the area of vent holes 17, the vent holes 17 being in communication with channel 28. Auxiliary housing 10 also has an externally mounted vent orifice 18 extending through its wall. Orifice 18 has a vent bore 31 therethrough which is in communication with the vent channel 28 within the interior of housing 10 and in communication with the atmosphere on the exterior. In the event an oil or water seal should fail, oil or water would leak into the vent holes 17 of seating member 20 and, then to vent channel 28 and, thence, through bore 31 of vent orifice 18, whereupon the leakage may be visually detected. The observer may, likewise, immediately determine which of the two seal assemblies has malfunctioned by merely checking the nature of the liquid which is discharged at vent orifice 18.

While a preferred embodiment of our invention has been described, it may be otherwise embodied within the scope of the appended claims.

We claim:

1. In an oil driven gear motor having a high oil pressure side, a low oil pressure side and a drive shaft rotatably mounted therein, a seal apparatus which comprises:

A. a housing having a shaft receiving bore, front and rear faces, an annular shoulder formed on the rear face adjacent the shaft receiving bore, at least two oil passageways one of which extends from the low pressure side and another of which extends from the high pressure side, said passageways having terminal ends adjacent the shaft receiving bore;

B. a first seal ring mounted within said annular shoulder around the rotatable shaft;

C. a second seal ring positioned around the rotatable shaft in spaced relationship from the first seal ring;

D. an intermediate annular seal member positioned about the rotatable shaft intermediate said seal rings and sealably against the motor housing adjacent the terminal ends of the passageways, said intermediate seal member having at least two oil ducts formed radially therethrough and exiting adjacent the rotatable shaft and an outer peripheral edge communicating with the terminal passageway ends through an annular channel;

E. an annular seal seating member positioned against the rear face of the motor housing about the rotatable shaft, a first annular shoulder adjacent the shaft to receive the second seal ring therein, a second annular shoulder formed in spaced relationship from said first shoulder to sealably receive the intermediate seal member, the outer periphery of said second annular shoulder having a diameter greater than the intermediate seal member to form the annular channel; and F. means associated with said motor housing to sealably secure said seal seating member to the housing;

whereby, oil flows from the high pressure side of the motor through at least one oil passageway to the oil ducts of the intermediate annular seal member, the oil flowing, under pressure, within the space defined by the first and second seal rings and exiting through at least one oil passageway to the low pressure side of the motor.

2. The seal apparatus of claim 1 wherein the means associated with said motor housing includes:

an auxiliary motor housing having an interior portion enclosing the shaft and the seal seating member, and an annular shoulder receiving the seal seating member therein, said auxiliary motor housing secured to the rear face of the motor housing whereby the seal seating member is sealably secured against the rear face of the motor housing and against the annular shoulder of the auxiliary housing.

3. The seal apparatus of claim 2 including an O-ring sealably positioned at the interface of the motor housing and the seal seating member, radially located between the terminal ends of the oil passageways and the outer periphery of said seal seating member.

4. The seal apparatus of claim 3 wherein the motor drive shaft includes an internal bore formed along its longitudinal axis, the auxiliary motor housing including an orifice to permit the introduction of water therein, said seal apparatus also including mechanical seal means associated with the seal seating member to prevent water leakage around the motor shaft adjacent the area of the second oil seal ring.

5. The seal apparatus of claim 4 in which the seal seating member includes a third annular shoulder formed adjacent its shaft receiving bore wherein the mechanical seal means comprises:

A. a cup-shaped seal member having a shaft receiving bore therethrough, sealably positioned within the third annular shoulder;

B. a first face seal member, annularly shaped, having a shaft receiving bore therethrough and a substantially flat face portion, sealably secured within the cup-shaped seal member;

C. a second face seal member, annularly shaped, having a shaft receiving bore therethrough and having an annular face portion sealably engaging the face portion of the first face seal member, the bore of said second seal member also sealably engaging the shaft; and D. means associated with the second face seal member to forceably urge the second face seal member into water tight engagement against the first face seal member and the shaft.

6. The seal apparatus of claim 5 wherein the means associated with the second face seal member includes:

A. a coil spring positioned around the second face seal member and compressingly acting thereon; and B. spring securement means positioned on the shaft to maintain the spring in a compressed state against the second face seal member, whereby a water tight seal between the first and second face seal members and shaft is maintained while the shaft is rotated.

7. The seal apparatus of claim 6 including an O-ring sealably positioned at the interface of the auxiliary housing and the seal seating member to prevent water leakage around the seal seating member and said auxiliary housing.

8. The seal apparatus of claim 7 including a seal seating member having a plurality of vent holes formed therethrough, extending from the shaft receiving bore of said member to the outer cylindrical periphery thereof and positioned intermediate the first and third annular shoulders, an annular vent channel formed between the seal seating member and auxiliary housing in communication with the vent holes, said auxiliary housing member also having a vent orifice positioned in communication with the vent channel for leak detection.

9. The seal apparatus of claim 8 wherein the motor housing has two oil passageways formed therein.

10. The seal apparatus of claim 9 including at least two orifice plugs positioned on the front face of the motor housing in communication with the aforementioned oil passageways.

* * * * *